Jan. 23, 1968        H. C. SWIFT        3,365,029
ADJUSTING MEANS FOR DISK BRAKES
Filed Feb. 17, 1966        2 Sheets-Sheet 1
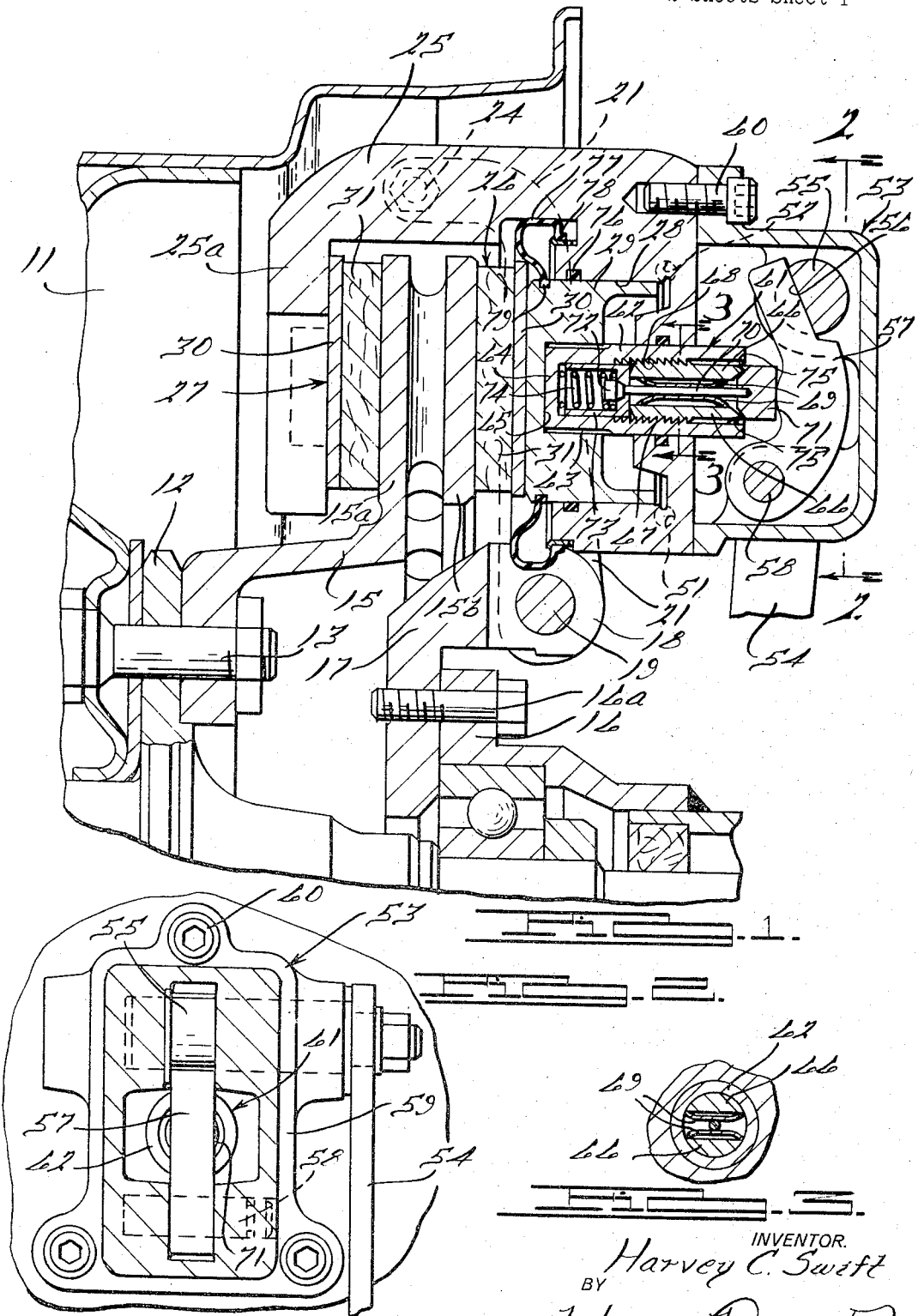
INVENTOR.
Harvey C. Swift
BY
Harness, Dickey & Pierce
ATTORNEYS.

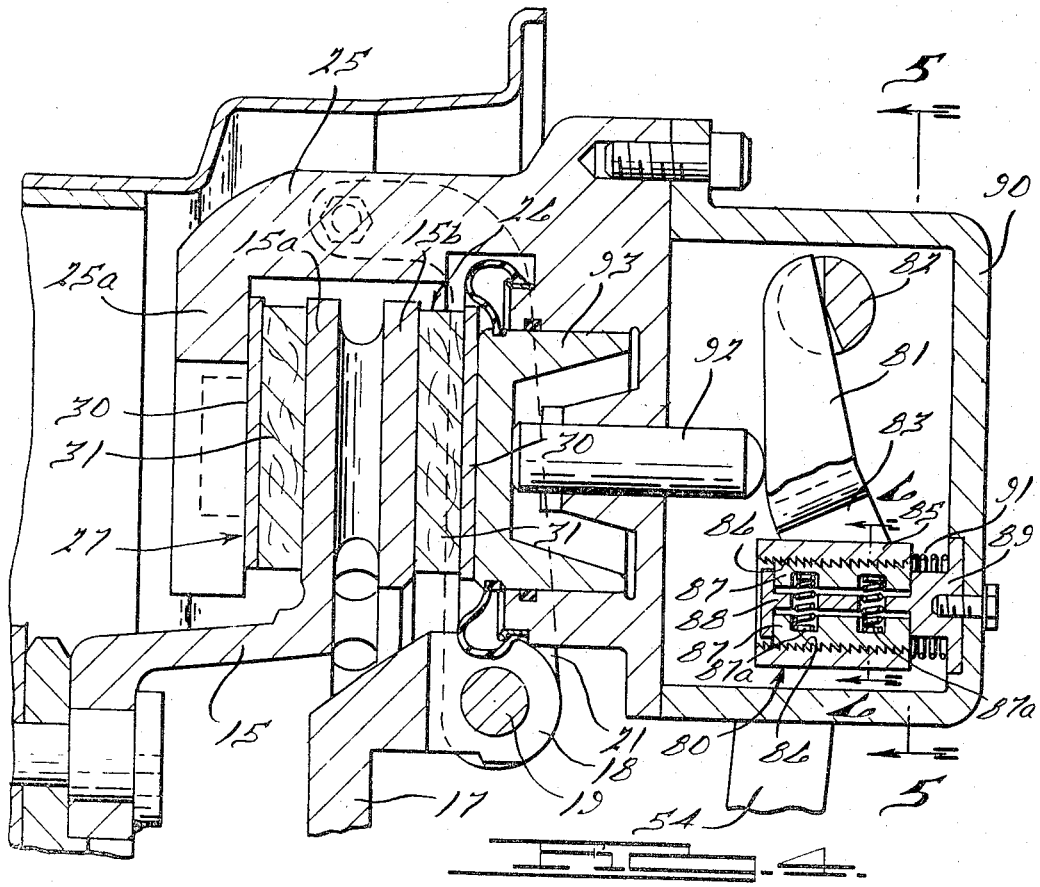
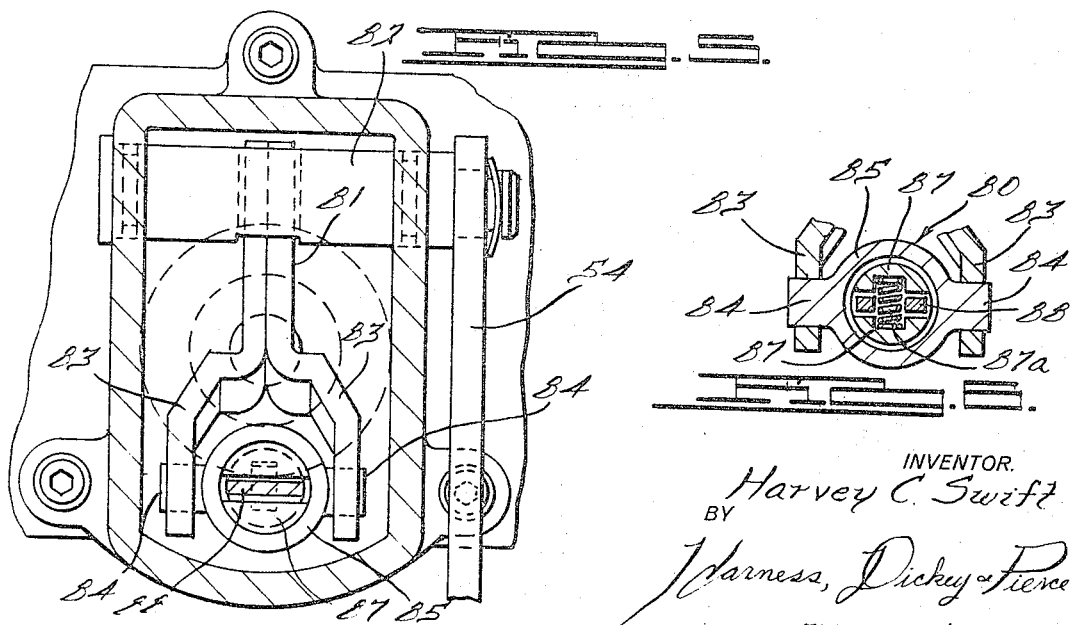

United States Patent Office 3,365,029
Patented Jan. 23, 1968

3,365,029
ADJUSTING MEANS FOR DISK BRAKES
Harvey C. Swift, Birmingham, Mich., assignor to Kelsey-Hayes Company, Romulus, Mich., a corporation of Delaware
Filed Feb. 17, 1966, Ser. No. 528,247
8 Claims. (Cl. 188—73)

ABSTRACT OF THE DISCLOSURE

Two embodiments of disk brake assemblies incorporating different types of automatic adjusting devices for taking up wear in the frictional linings of the brake pads. In each embodiment the automatic adjusting device is an extensible assembly that is interposed between the actuating piston of the brake assembly and a pivotally supported lever, which lever may also be used for manual operation of the brakes. The extensible assembly includes a serrated ratchet mechanism that permits elongation of the assembly upon excessive wear of the brake lining but which precludes compression or shortening of the member when it is transmitting a force.

---

This invention relates to brakes of the disk type and, more particularly, to a combined hydraulic and mechanical brake and to improvements therein tending to simplify, render more efficient, and to improve generally brakes of this type.

It is an object of this invention to provide a hydraulically operated disk brake having a mechanically operated parking or emergency brake combined therewith in such a manner that each brake actuating mechanism may be operated independently of the other and wherein the combined brakes and actuating means therefor are consolidated and assembled into a unit which may be economically manufactured, quickly and easily assembled and installed, and in which maintenance costs are reduced to a minimum.

Another object of the invention is to provide a mechanical brake actuating means which is associated with the hydraulically operated portion of the brake in such a manner that the same brake actuating piston may be employed for actuating the brakes both hydraulically and mechanically.

Another object of the invention is to provide means, operable when the brake is actuated hydraulically, to adjust the position of the brake actuating piston to compensate for wear on the brake shoe linings.

The various objects and advantages, and the novel details of construction of two commercially practical embodiments of the invention will become more apparent as this description proceeds, especially when considered in connection with the accompanying drawings, in which:

FIGURE 1 is a fragmentary sectional view through a disk brake constructed in accordance with this invention, with a portion of the wheel indicated in full lines;

FIGURE 2 is a sectional elevational view taken substantially on the plane indicated by line 2—2 in FIGURE 1;

FIGURE 3 is a detail sectional view taken on line 3—3 in FIGURE 1;

FIGURE 4 is a view substantially the same as FIGURE 1, showing a modified form of construction;

FIGURE 5 is a sectional elevational view taken substantially on the plane indicated by line 5—5 in FIGURE 4; and FIGURE 6 is a detail sectional view taken on line 6—6 in FIGURE 4.

One modification of the brake of this invention is illustrated in FIGURES 1, 2 and 3 and is shown as being associated with a vehicle wheel body 11 secured to the axle flange 12 by means of studs or bolt and nut assemblies 13. Also secured to the axle flange 12, as for instance by means of the same studs or bolt and nut assemblies 13 for rotation with the body 11, is a brake disk 15. The brake disk 15 is of the ventilated type having spaced walls 15a and 15b.

Secured to a fixed part 16 of the axle structure, as by means of bolts 16a, is a torque member 17. Attached to the torque member 17 are spaced sleeve-like members 18 through which a shaft or rod 19 extends. A spacer sleeve (not shown) is positioned on rod 19 between the sleeves 18. The reference character 21 indicates a pair of links rotatably journaled along the shaft or rod 19. These links are freely rotatable on the shaft or rod 19 and the upper free end of each member 21 is freely journaled as at 24 to a caliper-like member 25 which straddles a portion of the periphery of the brake disk 15. The pivotal supports 24 for the caliper-like member 25 are independent of one another so that independent pivotal movement of the caliper-like member 25 on the pivots 24 is possible. The pivotal supports 24 are in alignment with one another transversely of the caliper-like member 25 and are preferably arranged in radial alignment with the periphery or the rotor or brake disk, whereby the caliper 25 is pivotally supported equidistant from braking surfaces of the braking disk. The details of construction just described are shown more fully in my copending application Ser. No. 514,345, filed Dec. 16, 1965.

One leg of the caliper 25 is provided with a recess 28 forming a cylinder to slidably receive a piston 29. When fluid under pressure is admitted to the recess 28 the piston 29 is moved to the left, as viewed in FIGURE 1, and engages the adjacent brake shoe 26 to move it against the rotor or brake disk 15. The reaction of the movement of the piston operates in an opposite direction to move the caliper 25 so that the other end 25a of the caliper moves against the brake shoe 27 to force the same into engagement with the brake disk 15. Thus, both brakes are actuated simultaneously by the use of a single piston.

Each brake shoe is provided with a backing plate 30 carrying a friction lining 31 adapted to engage the braking surfaces 15a and 15b of the brake disk 15.

The brake shoes may be operated either hydraulically or manually as shown in FIGURE 1. Fluid will be admitted behind the piston 29 through an inlet 51. The reference character 52 indicates a bleed opening.

The brake shoe 26 is engaged by the piston 29 to operate the brakes hydraulically and the brakes may also be operated manually by means contained within a housing 53. The manually controlled means is shown as comprising an operating lever 54 which may be connected by a link or the like (not shown) to an operating handle (not shown). The lever 54 is connected to a cam shaft 55 having a cam surface 56. The cam surface 56 engages the free end of a lever 57 pivotally mounted on a shaft 58 journaled in the housing 53, secured by bolts or the like 60 to the caliper 25. Movement of the lever 57 to the left, as seen in FIGURE 1, will move an extensible member 61 to the left, to move the piston 29 and apply the brakes.

The extensible member 61 comprises an outer sleeve-like member 62 having a longitudinally fluted portion 63 and a closed end portion 64 adapted to engage the bottom of a recess 65 formed in the piston 29. The piston 29 is movable relative to the sleeve-like member 62 when the brakes are applied hydraulically. During this time fluid under pressure may flow through the flutes 63 and act on end portion 64 to hold the extensible member 61 in engagement with the lever 57.

Arranged within the sleeve-like member 61 is a pair of segments 66 provided with abutment teeth 67 engaging internally arranged abutment teeth 68 on the interior of the sleeve-like member 62. The segments 66 are normally urged outwardly so as to insure engagement of the teeth 67, 68, by means of leaf springs 69. Extending longitudinally of the extensible member 62 is a rod 70 on the right hand end of which is fixed a wedge member 71. The member 71 is engaged by the lever 57 and the other end of the rod 70 is provided with a head 72 which engages a slidable sleeve member 73. Arranged within the sleeve member 73 is a spring 74 which normally urges the sleeve member 73 and the segments 66 toward the right and the sleeve member 62 to the left.

When the piston 29 is actuated by the hydraulic pressure the extensible member 61 tends to move under hydraulic pressure toward the right in FIGURE 1, and piston 29 moves toward the left to actuate the brake shoe 26. If the movement of the piston 29 is such, due to wear on the brake lining, that there is sufficient relative movement between the piston 29 and extensible member 61 the spring 74 will cause the sleeve member 62 to move one tooth space to the left so as to lengthen the extensible member 61 to cause a greater movement of the brake shoe on the next operation.

The wedge member 71 is formed with wedge surfaces 75 which engage corresponding wedge surfaces on the adjacent ends of segments 66 to assist the leaf springs 69 in holding the teeth on segments 66 in engagement with the teeth along the sleeve member 62.

When the brake is manually operated by the lever 57 the force of the lever is exerted on the head 71 which holds the segments 66 in to force transmitting engagement with the sleeve member 62 so that there is no relative movement between the segments 66 and the sleeve member 62 during the manual operation of the piston 29.

The piston 29 may be provided with annular seal 76 which may be in the form of an O-ring. A boot 77 is attached to the caliper, as indicated at 78 and to the piston 29, as indicated at 79. This prevents dust and dirt from entering between the bore 28 in the caliper and the piston 29.

A modified form of construction is illustrated in FIGURES 4, 5 and 6. In this form of construction the extensible member 80, which corresponds to the extensible member 61 in the first form of construction, is associated with the pivots of the brake actuating lever 81. This brake actuating lever is moved by means of a cam member 82. The lower end of the actuating lever 81 is provided with bifurcations 83 which pivotally engage opposed projections 84 extending from the outer sleeve 85 of the extensible member 80, see FIGURE 6. The interior of the sleeve member 85 is formed with abutment-type threads or teeth 86 which engage similar abutment-type teeth or threads on a pair of segments 87 urged radially outwardly by spring 87a. The segments 87 are carried by an arbor-like member 88 which is carried by a supporting member 89 secured to the housing 90 which houses the lever 81 and the extensible member 80. Arranged between the sleeve member 85 and the supporting member 89 is a spring 91.

The lever 81 engages a plunger 92 slidably mounted on the caliper 25. The other end of this plunger 92 engages a piston 93 which corresponds to the piston 29 in the previously described construction.

The spring 91 normally urges the sleeve 85 carrying the pivots 84 to the left as seen in FIGURE 4 but there will be no movement of the pivots 84 of the lever 81 so long as the parts are in the position illustrated in FIGURE 4. However, if the movement of the piston 93 is such, due to wear on the brake lining, that the piston 93 moves away from the plunger 92, the spring 91 will move the sleeve member 85 one tooth space to the left and thus move the pivots 84 of the lever 81 to the left to bring the parts back to the position illustrated in FIGURE 4. Therefore, this automatic adjustment of the position of the pivots 84 will maintain the lever 81 in engagement with plunger 92 so that the brake will always be capable of manual operation.

While two commercially practical embodiments of the invention have been described and illustrated herein somewhat in detail, it will be understood that various changes may be made as may come within the purview of the accompanying claims.

What is claimed is:

1. A disk brake assembly for braking a rotatable disk having opposing braking surfaces, said brake assembly comprising a caliper straddling at least a portion of the periphery of the brake disk, a pair of opposed brake pads associated with said caliper, a piston slidably supported by said caliper and associated with at least one of said brake pads for bringing said brake pad into frictional engagement with the associated braking surface of the disk, automatic adjusting means for limiting the movement of said piston in a direction opposite to the direction the piston moves when bringing the brake pad into engagement with the disk, said automatic adjusting means comprising a sleeve like member having a closed end adapted to abuttingly engage said piston and defining an internal bore with longitudinally spaced serrated teeth formed therein, a pair of locking members supported within said bore and having serrated teeth formed thereon complementary to the serrated teeth of said sleeve like member, first biasing means for urging said teeth of said locking members into engagement with the teeth of said sleeve like member and second biasing means supported within said bore and abuttingly engaging said sleeve like member and said locking members for urging said sleeve like member longitudinally away from said locking members and for exerting a force tending to increase the length of said automatic adjusting means, and abutment means fixed relative to said caliper and against which said locking members operatively react.

2. A disk brake assembly as set forth in claim 1 wherein the piston is formed with a bore in which the closed end of the sleeve like member is received, said piston being slidably supported in a closed chamber adapted to receive fluid under pressure for actuating said piston, and means providing for fluid communication between said chamber and said closed end of said sleeve like member.

3. A disk brake assembly as set forth in claim 2 wherein the means for providing fluid communication comprise longitudinally extending flutes formed in the outer periphery of the sleeve like member.

4. A disk brake assembly as set forth in claim 1 wherein the second biasing means is associated with one end of the locking members, the other end of said locking members being in abutment with a wedge member, said wedge member being adapted to abuttingly engage a component fixed relative to the caliper.

5. A disk brake assembly as set forth in claim 4 further including manual operating means for said brake assembly, said manual operating means being engaged with the wedging member for transmitting a force through the automatic adjusting means to the piston.

6. An automatic adjusting device for disk brakes or the like comprising a sleeve like member defining an internal bore open at one end and closed at the other end by an integral wall adapted to abuttingly engage an associated component of an associated disk brake assembly, a plurality of circumferentially extending longitudinally spaced serrated teeth formed in said sleeve like member and opening into said bore, a pair of segmented locking members supported within said bore, said locking members having serrated teeth complementary to and adapted to engage said teeth of said sleeve like member, first biasing means interposed between said locking members for urging said locking members radially outwardly within said bore, second biasing means in said bore interposed between one end of said locking members and said integral end wall of said sleeve like member for urging said sleeve like member and said locking members longitudinally away from each other, and a wedging member abuttingly engaged with the other end of said locking members and adapted to abuttingly engage a component of the associated disk brake assembly.

7. An automatic adjusting device as set forth in claim 6 wherein the first biasing means comprises a leaf spring and the second biasing means comprises a coil spring.

8. An automatic adjusting device as set forth in claim 6 wherein the wedging member is affixed to a rod extending between the locking members, the first biasing means comprising leaf spring means interposed between said rod and said locking members, said rod being headed at its other end and slidably supporting a sleeve member, the second biasing means comprising coil spring means contained within said sleeve member.

References Cited

UNITED STATES PATENTS

| | | | |
|---|---|---|---|
| 2,527,156 | 10/1950 | Schuster | 188—79.5 |
| 2,736,396 | 2/1956 | Rasmussen et al. | 188—196 |
| 3,236,336 | 2/1966 | Harrison | 188—73 |
| 3,269,490 | 8/1966 | Swift | 188—73 |

FOREIGN PATENTS

| | | |
|---|---|---|
| 1,345,151 | 10/1963 | France. |
| 806,919 | 1/1959 | Great Britain. |

MILTON BUCHLER, *Primary Examiner.*

G. E. HALVOSA, *Assistant Examiner.*